United States Patent [19]

Ho et al.

[11] Patent Number: 5,233,545
[45] Date of Patent: Aug. 3, 1993

[54] TIME INTERVAL TRIGGERING AND HARDWARE HISTOGRAM GENERATION

[75] Inventors: Leland M. Ho, Sunnyvale; Paul S. Stephenson, Pleasanton; John S. Schmitz, Sunnyvale, all of Calif.

[73] Assignee: Hewlett-Packard Company, Palo Alto, Calif.

[21] Appl. No.: 976,704

[22] Filed: Nov. 16, 1992

Related U.S. Application Data

[63] Continuation of Ser. No. 409,183, Sep. 19, 1989, abandoned.

[51] Int. Cl.⁵ ............................................. G06M 3/08
[52] U.S. Cl. ...................................... 364/569; 377/13
[58] Field of Search ................... 364/569, 770; 377/13

[56] References Cited

U.S. PATENT DOCUMENTS

| | | | |
|---|---|---|---|
| 4,142,238 | 2/1979 | Brandt et al. | 364/569 X |
| 4,394,695 | 7/1983 | Mahon | 377/13 X |
| 4,755,887 | 7/1988 | Deaver et al. | 369/19 X |
| 4,849,924 | 7/1989 | Providenza et al. | 364/770 |
| 4,920,271 | 4/1990 | Arnone | 377/10 X |

OTHER PUBLICATIONS

HP 5371A—Operating Manual, "Graph Format Menu", pp. 10-1 to 10-4 Oct. 1987.
HP 5371A Frequency and Time Interval Analyzer, Technical Data, Oct. 1988.
Hewlett-Packard Journal, Feb. 1989, p. 33.
Hewlett-Packard Journal, Feb., 1989, p. 35-41.
M. Abdelguerfi, et al.—"Parallel Bit-Level Pipelined VLSI Processing Unit for the Histogramming Operation"—Jun. 1988—pp. 945-950.

Primary Examiner—Edward R. Cosimano

[57] ABSTRACT

A time interval data processing circuit uses a pipelined hardware data processor to perform the conversion of incoming time stamp data into time interval results. These results can be further processed into a hardware accumulated histogram or can be compared against limits to determine if a time interval trigger condition has occurred. In the first stage of the pipeline, the processing circuit subtracts the two time stamps from the current and the previous event to determine the time interval between events being measured. The second stage checks the measurement result against minimum and maximum limits and determines which bin the measurement belongs in. The limit testing determines if the measurement fits the histogram limits and also yields the data required to perform measurement triggering on time intervals. The third stage of the pipeline increments the appropriate histogram bin in RAM. The first and third stages of the pipeline are themselves pipelined in substages. To facilitate pipelining in storing the histogram results, the circuit uses dual port RAMs to achieve a fast data accumulation rate. When histogramming, the stored bin data must be incremented each time a new measurement occurs. The third pipeline stage read, increment, write operation is pipelined in substages by adding a latch in the data incrementing loop for the dual port RAM. The latch also provides a way of avoiding access conflicts when the same bin is incremented repeatedly.

14 Claims, 3 Drawing Sheets

TIME INTERVAL TRIGGERING AND HARDWARE HISTOGRAM GENERATION

Cross Reference to Related Application

This is a continuation of copending application Ser. No. 07/409,183 filed on Sep. 19, 1989, now abandoned.

FIELD OF THE INVENTION

The invention relates to apparatus and a method for processing measurement data. In particular, the invention relates to pipelined processing of time interval measurement data to provide triggering on selected time interval conditions and to provide rapid histogramming of the measurement data.

BACKGROUND OF THE INVENTION

Continuous time interval measurements on a signal provide a way to analyze characteristics of the signal in the modulation domain, i.e., the behavior of the frequency or phase of the signal versus time. This is different than classic ways of measuring and displaying data about signals. An oscilloscope shows amplitude versus time: the time domain. A spectrum analyzer shows amplitude versus frequency: the frequency domain.

Continuous time interval measurements make it simpler to study dynamic frequency behavior of a signal: frequency drift over time of an oscillator, the frequency hopping performance of an agile transmitter, chirp linearity, and phase switching in radar systems.

A histogram is a picture of the distribution of measurement results as a function of a selected variable. For time interval results, for example, a histogram might display the distribution of a set of measurements over a range of time durations.

Generally, compiling data into a histogram using software processing is very slow because there is so much processing time between blocks of measurements. For example, in the Hewlett-Packard 5371A Time Interval Analyzer data is acquired, processed, and added to a growing histogram one block at a time in blocks of up to 1000 measurements. There is about 6 seconds for every 1000 measurement block. At this rate, it would take about 69 days to accumulate 1 billion measurements.

Compiling the histogram using hardware greatly improves the rate at which data can be histogrammed. With the histogram circuit of the invention, data can be collected at a rate of at least 10 MHz. At this rate, it would take only 100 seconds to acquire 1 billion measurements. This is 60,000 times faster than the histogram rate of the software method.

When histogramming, the stored bin data must be incremented each time a new measurement occurs. For non-incrementing RAMs, this requires that the stored data be read, incremented, and then written back into the RAM. Using a standard single port RAM, this requires that two memory cycles plus an increment calculation be performed in the time between data acquisitions. This severely limits the speed at which histogramming can be performed.

Event triggering is used to capture the data for a particular event of interest. A circuit is programmed to produce a trigger signal on the occurrence of some aspect of the input waveform that is characteristic of the event to be captured. In response to the trigger signal, a memory controller stops the flow of data into memory, so the memory holds the last iteration of data written into memory, which is the data from the event of interest. Depending on the delay from the trigger signal to the stop writing command, data prior to, subsequent to, or surrounding the trigger event will be captured.

There are a variety of conventional triggering modes, based on the amplitude or the slope of the input waveform. For example, by using maximum and minimum limit values (hystersis bands), the trigger can be set to occur when the input signal crosses a threshold voltage in a positive direction, a negative direction, or either direction.

SUMMARY OF THE INVENTION

The time interval data processing circuit of the invention uses a pipelined hardware data processor to perform the conversion of incoming time stamp data into time interval results. These results can be further processed into a hardware accumulated histogram or can be compared against limits to determine if a time interval trigger condition has occurred. By pipelining the processing of time stamp data, these operations can be performed while maintaining a fast rate of data acquisition.

In the first stage of the pipeline, the processing circuit substracts the two time stamps from the current and the previous event to determine the time interval between events being measured. The second stage checks the measurement result against minimum and maximum limits and determines which bin the measurement belongs in. The limit testing determines if the measurement fits the histogram limits and also yields the data required to perform measurement triggering on time intervals. The third stage of the pipeline increments the appropriate histogram bin in RAM. The first and third stages of the pipeline are themselves pipelined in substages.

The time interval trigger capability allows a time interval measurement to be terminated by a specified measurement result rather than by the measurement count. This is a powerful feature because it allows measurements to be made around key events of interest. Triggering on time interval results is made possible by real-time hardware processing of the time stamp data. The results of the comparisons with maximum and minimum limit values set by the user can determine whether the measurement should be terminated.

To facilitate pipelining in storing the histogram results, the time interval data processing circuit uses dual port RAMs to achieve a fast data accumulation rate. When histogramming, the stored bin data must be incremented each time a new measurement occurs. The third pipeline stage read, increment, write operation is pipelined in substages by adding a latch in the data incrementing loop for the dual port RAM. During the first substage, data is read out of the RAM through a dedicated read port and is latched externally. During the second substage of the pipeline, the latched data is incremented and written back into the second port of the dual port RAM. The latch also provides a way of avoiding access conflicts when the same bin is incremented repeatedly.

Additionally, an offset can be subtracted from the time interval result prior to histogramming or limit testing, to compensate for any channel skew that may exist between the two time stamps.

DETAILED DESCRIPTION OF THE INVENTION

The time interval data processing circuit takes measurement data coming from the counting hardware, processes it, and compresses it into a histogram. By performing these actions in hardware, measurement data can be collected in real-time from the counting hardware. This allows a large number of measurements to be histogrammed in a very short amount of time.

The measurement data processing through the processing circuit is pipelined in order to improve its speed and efficiency. This means that the task of histogramming is divided into smaller tasks that can be executed in separate stages. Each stage can perform a task on a different measurement value at the same time. In this way, the histogram processor increases its efficiency by performing more than one task simultaneously.

Figure 1:
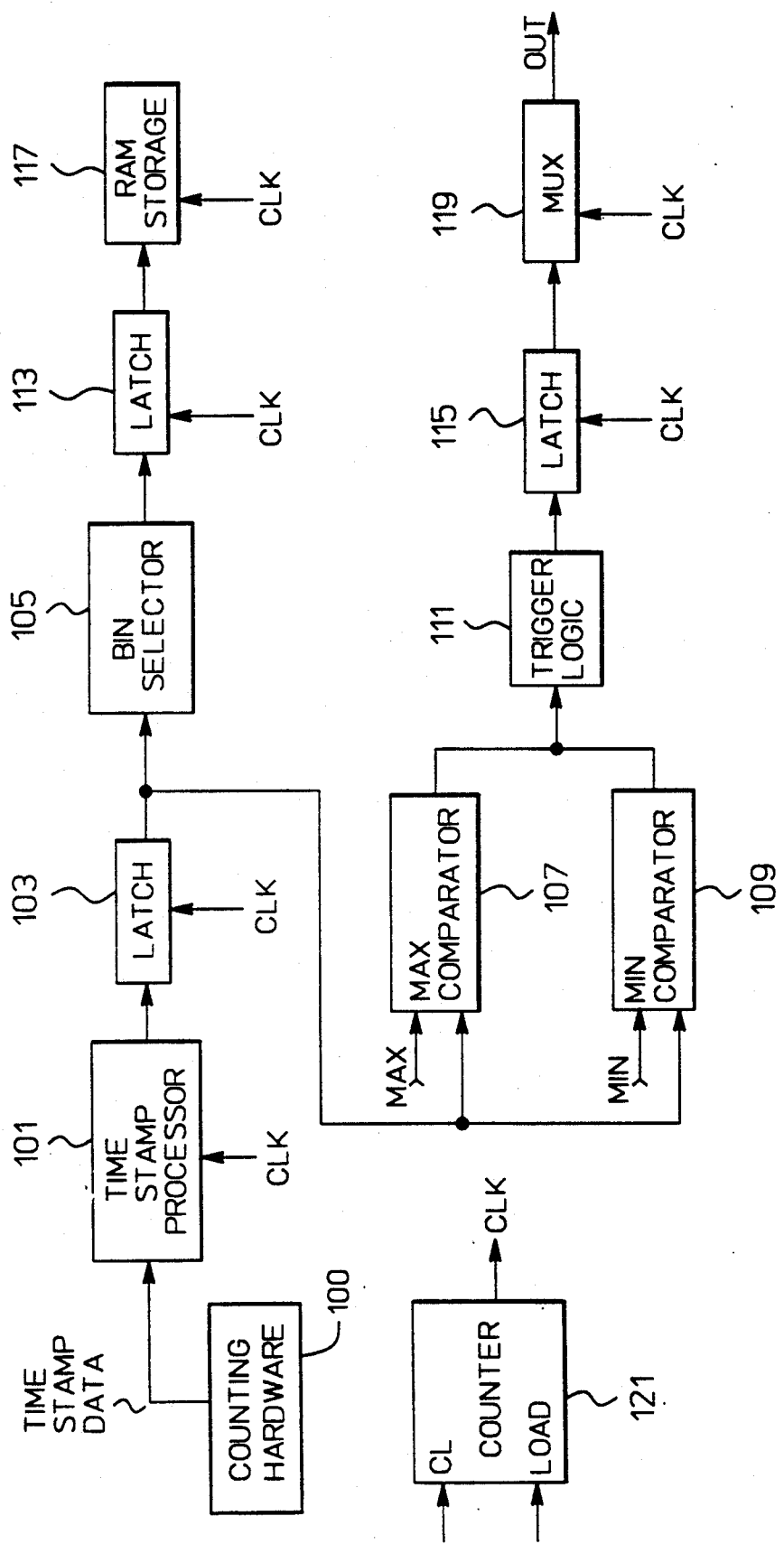
FIG. 1 shows a schematic block diagram of a pipelined time interval data processing circuit constructed according to the teachings of the invention.

FIG. 1 shows a schematic block diagram of a pipelined time interval data processing circuit constructed according to the teachings of the invention. The first stage of the pipeline is a time stamp processor 101 that receives a stream of time stamp data from counting hardware 100 and subtracts two consecutive time stamps to compute the time interval between the two represented events. The resulting time interval data is latched by latch 103, and used both for histogram input and triggering.

Time interval measurement data arrives at the processing circuit as a series of time stamps that mark the time at which events occurred. Time stamp processor 101 calculates the time interval between two events by subtracting the time at which events occurred, i.e., by subtracting their corresponding time stamps. An example of an instrument that generates this type of time stamp and continuous time interval data is described in "Frequency and Time Interval Analyzer Measurement Hardware", Paul S. Stephenson, Hewlett-Packard Journal, Vol. 40, No. 1, February, 1989.

The time interval data is applied to bin selector 105, to comparator 107, and to comparator 109, which along with trigger logic 111 comprise the second stage of the pipeline. Latches 113 and 115 separate the outputs of bin selector 105 and trigger logic 111 from the third pipeline stage.

Bin selector 105 extracts the bin number from the time interval data, as described in detail below. The bin selector 105 can only be set up to acquire histograms with certain quantized bin sizes. This is because the bin number that a measurement falls into is determined by directly extracting a bit field from the time interval data. This means that the bin size can only be powers of two multiples of the time interval represented by the least significant bit, which is a function of the frequency of the time base used for the counters and the interpolator.

Comparator 107 compares the time interval data to a preset upper limit value. Similarly, comparator 109 compares the time interval data to a preset lower limit value.

For histogram operation, the limits are set to determine if the time interval data falls within the valid histogram range. If the time interval data is within the limits, the trigger logic 111 output is valid and the bin of the histogram in RAM storage 117 indicated by the bin selector 105 is incremented by one. If not, an overflow or an underflow counter, not shown, is incremented. Limit testing is performed to insure that measurements are uniquely mapped into the histogram bins. The values that the limits are set to determine the offset of the histogram window.

For time interval triggering operation, the limits are set to determine whether a time interval trigger condition has been met. If so, then the trigger logic 111 output is valid, and a signal is sent to halt the measurement.

The function performed by the histogram limit testing yields the data required to perform measurement triggering on time intervals. The trigger logic 111 is a logic network that produces output signals as a function of the output from comparators 107 and 109. Multiplexer 119 selects the trigger output from eight possible signals: MAXGT (greater than the max limit), MAXEQ (equal to the max limit), MAXLT (less than the max limit), MINGT (greater than the min limit), MINLT (less than the min limit), INRANGE (between or equal to the min and max limits), OUTRANGE (greater than the max limit or less than the min limit) and ISF TRIGGER (interval sampling frequency). The first five of these signals are obtained directly from the magnitude comparators. The ISF TRIGGER signals specify with two bits whether the time interval data is equal to the max limit, equal to the min limit, between the min and max, or out of range.

For histogram operation, the INRANGE trigger signal is used as a valid data tag to determine whether data should be added to the histogram or not.

The third pipeline stage is RAM storage 117. RAM storage 117 reads the current count of histogram bin selected by bin selector 105 and latched in latch 113, and increments the bin count and writes it back.

A dual port RAM is used to hold the histogram bin counts because it allows the read/increment/write cycle of the histogram circuit to be pipelined. By pipelining, only one memory access is performed per clock cycle. This provides a great speed advantage over regular single port RAMs that would require two accesses per cycle. On each clock cycle one bin location is read via the first port of the dual port RAM, while another bin location is written to via the second port.

Special handling is required if both ports are accessing the same bin location. This happens when two measurements in a row have fallen into the same bin. In this case, the incremented value that is to be written back into the RAM is latched back into the incrementer latch instead of the value that is being read from the RAM. This value is then incremented a second time on the next clock cycle. This operation is described in more detail later.

The stages and substages in the pipeline are clocked by clock pulses from a free running, loadable counter 121. It is important to synchronize the pipeline clock with the arrival of event data. The counter 121 receives a clock input from a high frequency master clock, and produces a clock output pulse (CLK) periodically if no measurement event occurs. If a measurement event occurs, the counter is reset with an appropriate input at its load port from the event counter circuits (not shown), so the clock output is synchronized with the arrival of the event data at the time stamp processor 101. In a particular embodiment, where measurement events can occur as often as every 64 nS, the counter produces clock pulses every 56 nS, unless reloaded. This clock operation ensures that the data in the pipeline will be stored in the histogram RAM storage, and the trigger logic 111 will output a triggering signal, even if events cease.

SPECIFIC EMBODIMENT

Figure 2:
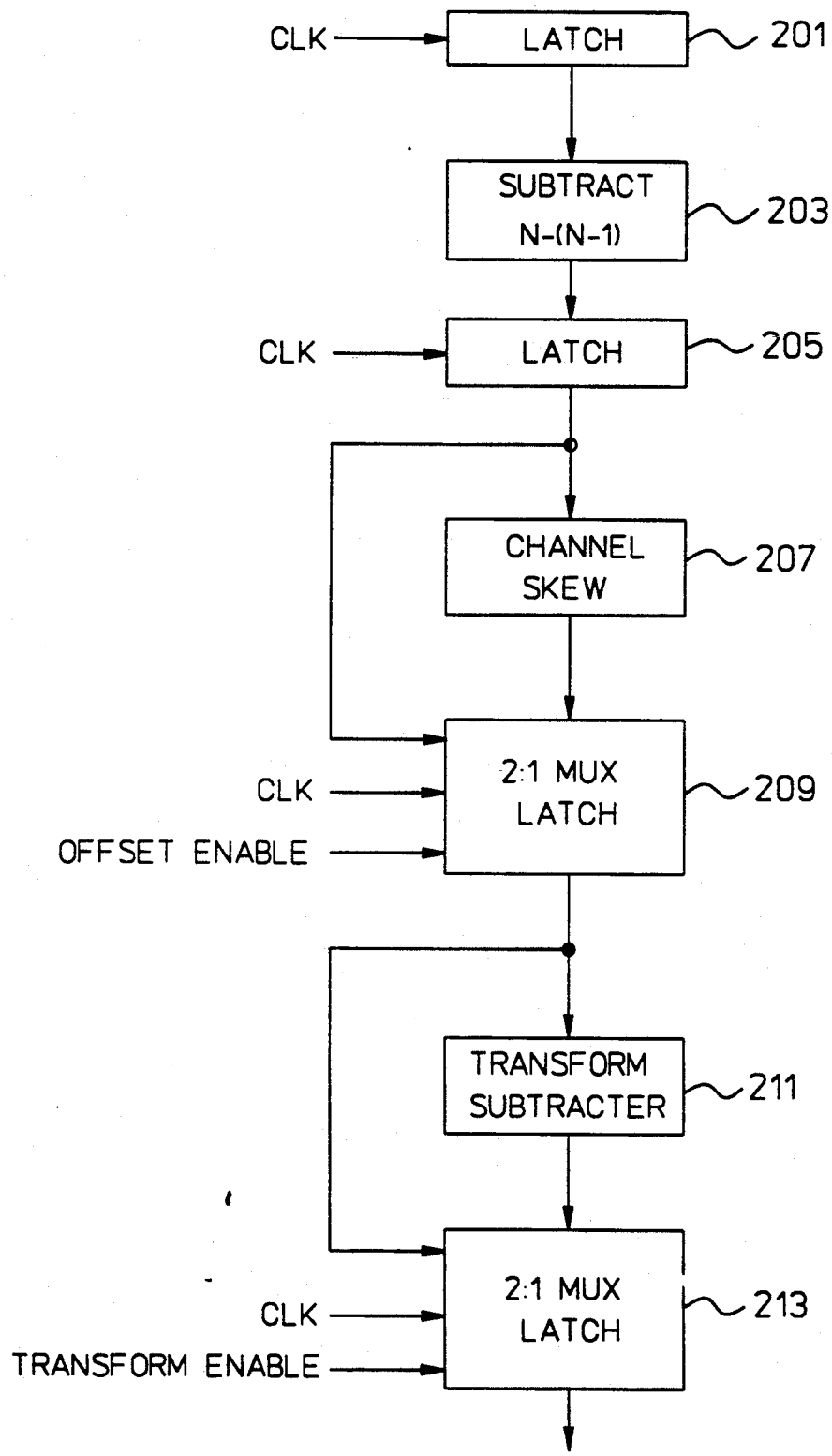
FIG. 2 shows a more detailed schematic block diagram of the time stamp processor 101 of FIG. 1.

FIG. 2 shows a more detailed schematic block diagram of the time stamp processor 101 of FIG. 1. The time stamp processor 101 has three pipelined substages of processing. The first substage 203 substracts two time stamps to obtain a time interval result. The second substage 207 subtracts an offset from the time interval result to correct for channel skew. The third substage 211 transforms this time interval result from a 2 nS binary and 200 pS BCD number to one 200 pS binary number. The substages are separated by latches 201, 205, 209, and 213. Latches 209 and 213 also contain 2:1 multiplex input ports, and serve to enable or bypass the functions of the second or third substages.

Although the processing circuit of the invention could be implemented in a variety of ways, the inventors have found that a particularly suitable implementation is a 1.5 micron gate length CMOS gate array, and fast CMOS static dual port RAMs.

Binary time stamp input data is latched in latch 201. The binary data can include digits from counters and from interpolator circuits, which increase the accuracy of the measurements.

In one specific embodiment, that will be described to illustrate the operation of the time stamp processor, each time stamp is 36 bits long. The upper 32 bits of the time stamp represent the time at which an event occurred according to the time counters, which keep track of the number of 2 nS clock periods that have occurred since the previous event. The lower 4 bits of the time stamp are from an interpolator, and represent the number of 200 pS periods that occurred between the event and the next edge of the 500 MHz time base. It will be understood that a wide variety of digital data types could be used to implement the teachings of the invention.

In the first substage of the time stamp processor pipeline, the time stamp subtractor 203 subtracts the two time stamps contained in the inputs TIME STAMP N−1 and TIME STAMP N, received from the counters and interpolators.

For interpolator operation, each time stamp is made up of two parts. The upper 32 bits are a binary value that represents the stage of the time ZDTs (Zero Dead Time counters) when an event occurs. The time counters (not shown) that provide the time stamp data are incremented every 2 nS by a 500 MHz clock. The lower 4 bits of the time stamp data are a Binary Coded Decimal (BCD) value that is generated by the interpolators (not shown). The interpolators increase the time resolution of the measurement by determining the number of 200 pS periods that elaspe between the event and the next cycle of the 500 MHz clock. The interpolators effectively break up each 2 nS cycle of the clock into ten 200 pS cycles.

The time interval between two events is determined by subtracting the time stamps associated with each event. The time stamp processor 101 always subtracts the counter value ($ZDT_{N-1}$) in TIME STAMP N−1 from the counter value ($ZDT_N$) in TIME STAMP N, but it subtracts the interpolator value ($IT_N$) from TIME STAMP N from the value in TIME STAMP N−1 ($IT_{N-1}$). This is because the interpolator values are subtracted from the counter values, and therefore cannot be appended directly to the counter value result. The time interval between events is calculated as follows:

Time Interval $= (ZDT_N - IT_N) - (ZDT_{N-1} - IT_{N-1})$

Time Interval $= (ZDT_N - ZDT_{N-1}) + (IT_{N-1} - IT_N)$.

The 36 bit time stamp subtractor 203 can be implemented with standard four bit adder blocks, carry look ahead blocks, and a special four bit subtractor block to handle the interpolator results. The interpolator subtracter block can be selected to perform either a binary or a BCD subtraction. This allows the interpolators to be either BCD or binary interpolators. The polarity of the interpolator subtraction block can also be reversed to permit direct histogramming of 36 bits.

The time stamp values are subtracted with adders by adding the minuend (contents of TIME STAMP N) to the 2's complement of the subtrahend (contents of TIME STAMP N−1). This is accomplished by connecting the inverted outputs of TIME STAMP N−1 to the adders and adding one by asserting the carry-in input to the adder chain.

In the second substage of the time stamp processor pipeline, the channel skew subtracter 207 subtracts an offset value from the time interval values calculated by subtractor 203. This computation may be required to compensate for the skew between start and stop latch signals. The effects of this skew must be factored out of the time interval results before they are histogrammed. This calculation cannot be made after histogramming is completed if the measurement data received by the processing circuit is compressed into a set of bin values. It would be impossible at that point to determine how many measurements in any given bin are in the wrong bin due to the effects of skew.

When the OFFSET_ENABLE bit is set at latch 209, the channel skew subtractor is enabled. Latch 209 selects and latches the output of channel skew subtracter 207. If OFFSET_ENABLE is not set, latch 209 selects and latches the output of latch 205, bypassing the channel skew subtractor 207.

In the third substage of the time stamp processor pipeline, the transform processor 211 transforms the time interval data from the form of a 32 bit binary 2 nS count and 4 bit BCD 200 pS count to a 36 bit binary 200 pS count. The transformation converts counter and interpolator values into one binary value that allows histogramming on the full data word, using all bins in the histogram RAM.

The transform processor 211 performs the transformation by multiplying the 32 bit ZDT value by 10 (to convert it to 200 pS counts) and adding the BCD interpolator value. The multiplication by 10 can be accomplished by adding the value of the ZDT bits shifted by 3 bits (to multiply it by 8) and the value of the ZDT bits shifted by 1 bit (to multiply it by 2).

Although there are two additions described (8*ZDT+2*ZDT+Interpolator), this transformation can be performed in one stage by one special adder. The 32 bit ZDT value shifted to the left by 3 bits (8*ZDT) concatenated with the three lower bits of the BCD number is added to the ZDT value shifted to the left 1 bit (2*ZDT). This takes care of all the bits except the most significant bit of the interpolator value. It is factored into the addition in the carry-in to bit 3. If the carry-out from bit 3 or the MSB of the BCD number is set, then a carry-in is generated into bit 3 of the adder. This works because whenever the MSB of the BCD number is set, a carry-out of bit 3 never occurs, and whenever a carry is generated out of bit 3, the MSB of the BCD number is 0.

When the TRANSFORM_ENABLE bit is set at latch 213, the transform subtracter is enabled. Latch 213 selects and latches the output of transform subtracter 211. If TRANSFORM_ENABLE is not set, latch 213 selects and latches the output of latch 209, bypassing the transform subtracter 211. Latch 213 corresponds to latch 103 on FIG. 1, which holds the output of the time stamp processor 101 for input to bin selector 105.

The bin selector 105 can only be setup to acquire histograms with certain quantized bin sizes. This is because the bin number that a measurement falls into is determined by directly extracting a 13 bit field from the 36 bit measurement result. This means that the bin size can only be powers of two multiples of 200 pS if the transform processor 211 was enabled, or powers of two multiples of 2 nS if the transform processor 211 was not enabled.

In the presently described specific embodiment, the bin number value is extracted from the time interval value by multiplexers that select the number of bits that the RAM storage 117 can hold. For example, for 8K RAM locations, 13 24:1 multiplexers are used to select the 24 13 bit fields possible from a 36 bit measurement value.

Figure 3:
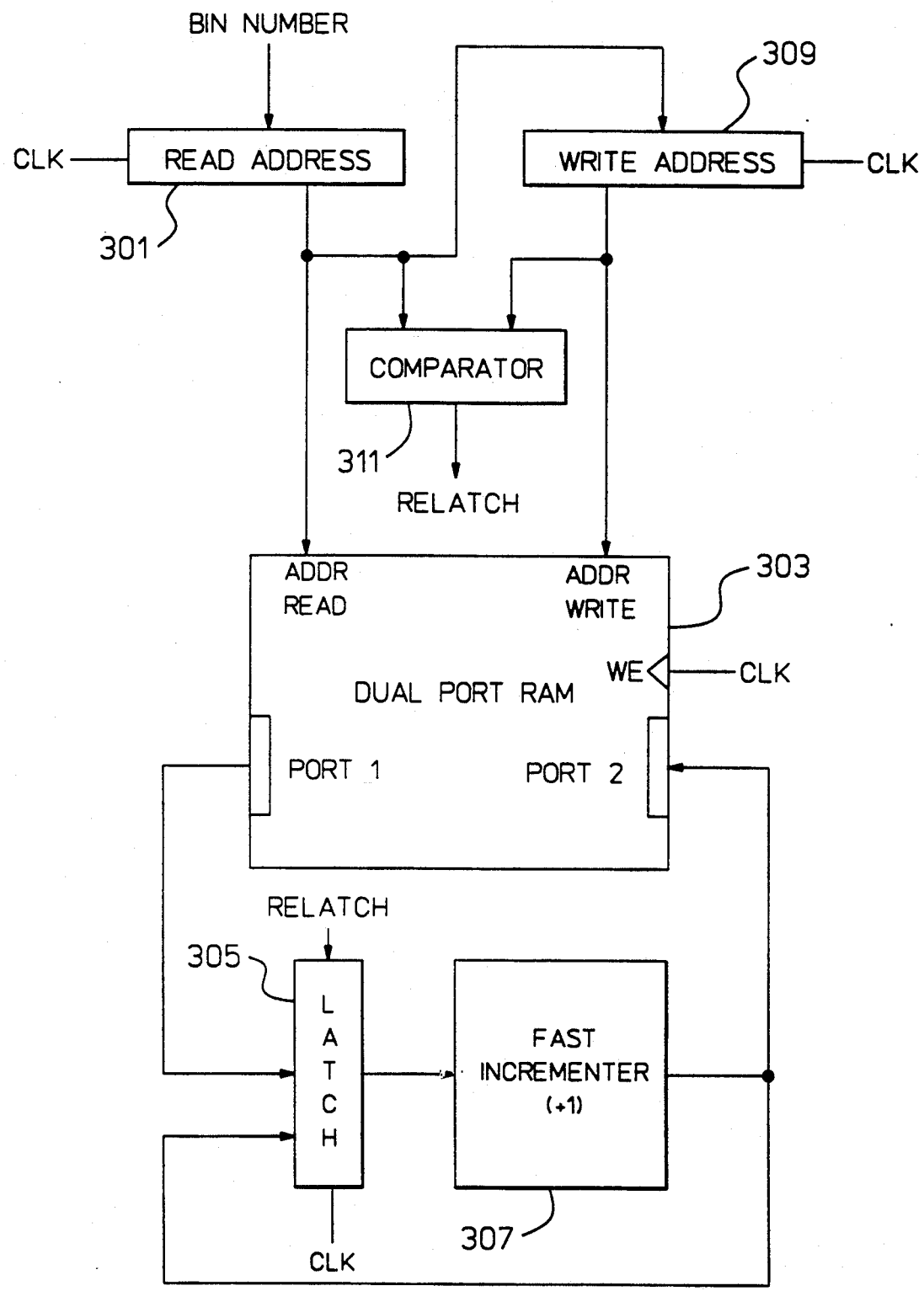
FIG. 3 shows a more detailed schematic block diagram of the RAM storage 117 of FIG. 1.

FIG. 3 shows a more detailed schematic block diagram of the RAM storage 117 of FIG. 1. A dual port RAM 303 stores the histogram bin counts because this type of RAM allows the read, increment, write cycle of the histogram storage circuit to be pipelined. In the first substage of the storage pipeline, a bin value is read out of the selected bin in RAM 303. In the second substage, incrementer 307 increments the bin value, and the incremented value is written back into the RAM 303. By pipelining, effectively only one memory access is performed per clock cycle. This provides a great speed advantage over regular single port RAMs that would require two accesses per cycle.

The bin number input is latched in read address latch 301, which corresponds to latch 113 in FIG. 1. The output of latch 301 is applied to the read address port of RAM 303. The bin number is used as the address for reading RAM 303, with the value from that bin address output from port 1 of RAM 303 and latched in incrementer latch 305. Incrementer 307 adds 1 to the bin value stored in incrementer latch 305.

The output of latch 301 is also applied to write address latch 309, so the write address latch will always hold the bin address that immediately preceded the bin address currently in read address latch 301. The output of latch 309 is applied to the write address port of RAM 303. Thus the preceding bin number is used as the address for writing back to RAM 303. The data to be written back comes from the incrementer circuit 307.

Special handling is required if both ports of RAM 303 are accessing the same location. When this happens, it means that two measurements in a row have fallen into the same bin.

Access conflicts to the dual port RAM 303 are detected by the bin address comparator 311. Comparator 311 is an equality comparator that compares the outputs from latches 301 and 309, i.e., the addresses going to the read and write ports of the RAM 303.

Access conflicts are determined by comparator 311, which receives the bin numbers from latches 301 and 309, compares them, and produces a relatch output which controls the operation of 2:1 latch 305. Latch 305 comprises a 2:1 multiplexer, with output controlled by the relatch signal, followed by a flip-flop. If two sequential bin numbers are equal, the read and write addresses are equal, the relatch output of comparator 311 becomes valid, and the incremented value from incrementer 307 is latched back into the incrementer latch 305, instead of the value that is being read from port 1 of the RAM 303. This value is then incremented a second time on the next clock cycle.

When an access conflict occurs with valid data in both the first and second storage pipeline substage, neither the read nor the write to the RAM needs to be successfully accomplished, but the specified bin data just needs to be incremented twice in a row. What is required is that the RAM be ready to access an arbitrary location on the next clock cycle. The correct data is written back into the RAM on the next non-conflict access cycle. Slave dual port RAMs, which have no arbitration control, are used to satisfy these requirements. RAM devices such as the Integrated Device Technology IDT 7142 slave dual port RAMs are suitable for this application.

Normally, a bank of dual port RAMs consists of one master part which contains arbitration logic that determines which port receives control during an access conflict. This master part then tells other slave parts, which have no arbitration logic, about its decision. In this way, the whole memory bank acts in unison. However, for the specific embodiment described, only slave parts can be used. Master parts would prevent arbitrary access to both ports on the cycle following an access conflict. This would cause data to be missed in a real-time data acquisition system.

FREQUENCY TRIGGERING

By using two of the processor circuits in parallel, it is possible to trigger on the occurrence of a selected frequency in the signal being measured. One processor receives time stamp data from measurement events, as described above. The second processor circuit receives event stamp data from the counter circuits, processing them in a similar manner to produce a count of the number of events that occurred between the start and stop events. The results are the time for a measurement and the number of events during that time, from which the frequency can be calculated.

However, for real time triggering, the frequency calculation may be slow, or require expensive hardware. Alternatively, the measurement can be made with interval sampling, arming so the stop event is the next event after a preset time period. Knowing the approximate measurement time and the frequency, the expected count can be determined, plus or minus one count quantization error. The maximum and minimum limits for the comparators 107 and 109 in the event stamp processor circuit can be set to the expected event count plus or minus 1, respectively. The trigger output is an indication that the measured signal is at the selected trigger frequency. The ISF TRIGGER signal described above can provide a suitable trigger. This result can be checked by comparing the time interval data from the time stamp processor circuit with a look up table programmed with counts and corresponding times.

We claim:

1. A pipelined time interval data processing circuit for converting time stamp data from signal measurement events into time interval results and processing the results into a hardware accumulated histogram having bins, said circuit comprising:

counting means for measuring time stamp data for an electrical signal, corresponding to a plurality of signal measuring events, the time stamp data marking the times at which the events occurred;

time stamp processor means for receiving the time stamp data, substracting two successive time stamps to produce a time interval result representing the time interval between the successive events, and providing a time interval result output signal;

comparator means, responsive to the time interval result output signal from the time stamp processor, for comparing the time interval result against minimum and maximum limits to determine whether the time interval result is valid histogram data and providing a valid data output signal when the time interval result is valid histogram data;

bin selector means, responsive to the time interval result output signal from the time stamp processor, for determining and identifying which histogram bin the time interval result belongs in, and providing a bin number output signal; and means for storing counts, each count representative of the number of occurrences in which said time interval result is identified with its histogram bin; said means being responsive to the bin number output signal and to the valid data output signal, for storing the counts for the histogram bins, and for incrementing the count of the histogram bin corresponding to the bin number output signal for a time interval result, if the comparator means provides the valid data output signal for that time interval result; wherein said means includes logic responsive to a clock having cycles and said means during one clock cycle operates to store the count which was previously incremented in a prior cycle and operates to increment the count to be stored in a subsequent cycle.

2. The processing circuit of claim 1, further comprising latch means having an input connected to the time stamp processor and an output connected to the bin selector for latching the time interval result output signal.

3. The processing circuit of claim 1, further comprising a free running, loadable counter having a first input and a second input, which receives a signal from a high frequency master clock for generating an output pulse periodically if no signal measurement event occurs, and if a signal measurement event occurs, for being rest with a signal from the counting means at the second port, so that the output pulse is synchronized with the arrival of the time stamp data at the time stamp processor.

4. The processing circuit of claim 1 wherein the time stamp processor comprises:

time stamp subtracter means for subtracting the two successive time stamps to obtain a raw time interval result; and channel subtracter means for subtracting an offset from the time interval result to correct for channel skew, to obtain a corrected time interval result.

5. The processing circuit of claim 4, wherein the time stamp data comprises more significant binary data bits and less significant binary coded decimal data bits, and the time stamp processor further comprises:

a transform processor for transforming the corrected time interval result to combine the more significant binary bits and the less significant binary coded decimal bits into a single binary bit stream.

6. The processing circuit of claim 1, further comprising logic means connected to the comparator means for generating a valid data tag to indicate that the time interval result should be added to a histogram bin corresponding to the bin number for that time interval result.

7. The processing circuit of claim 6 wherein the logic means comprises a multiplexer connected to the comparator means for selecting from eight signals, comprising MAXGT (greater than the maximum limit), MAXEQ (equal to the maximum limit), MAXLT (less than the maximum limit), MINGT (greater than the minimum limit), MINLT (less than the minimum limit), INRANGE (between or equal to the minimum and maximum limits), OUTRANGE (greater than the maximum limit or less than the minimum limit), and ISF TRIGGER (interval sampling frequency), and wherein the valid data tag is generated responsive to the INRANGE signal.

8. The processing circuit of claim 1 wherein:

the storing means comprises a clocked dual port RAM having a read address input, a first port for data output, a write address input, and a second port for data input;

the reading, incrementing, and writing means comprises:

a clocked first latch means having an input connected to the bin selector means and an output connected to the read address input of the dual port RAM, a clocked second latch means having an input connected to the output of the first latch means and an output connected to the write address input of the dual port RAM, a clocked third latch means having an input connected to the first port of the dual port RAM and an output, and non-clocked incrementer means for incrementing the data stored in the third latch means, having an input connected to the output of the third latch means and an output connected to the second port of the dual port RAM;

wherein, on each clock cycle the first latch, the second latch, the third latch, and the second port of the RAM latch the data available at their inputs;

so that on each clock cycle the count for a time interval result to be incremented is read from the RAM into the third latch means from the address on the first latch means, and the incremented count from the previous time interval result is written to the RAM at the address on the second latch means.

9. The processing circuit of claim 8 wherein the third latch has a second input to which the output of the incrementer means is connected and the reading, incrementing, and writing means further comprises:
    means for disabling the input from the first port of the dual port RAM to the third latch means and enabling the second input from the incrementer to the third latch means if the bin number stored in the first latch means and the bin number stored in the second latch means are the same, so that the incremented count and not the count from the first port of the RAM is read into the third latch means.

10. The processing circuit of claim 8, further comprising a bin access comparator having a first input connected to the output of the first latch means, a second input connected to the output of the second latch means, and an output connected to a second input of the third latch means, for detecting access conflicts to the dual port RAM and generating a relatch signal so that the incremented count from the incrementer means is latched back into the third latch means instead of the count to be incremented being read from the RAM.

11. A pipelined time interval data processing circuit for converting time stamp data from signal measurement events into time interval results and producing a triggering signal on selected time interval values, for controlling a time interval measurement, comprising:
    a time stamp processor means for receiving time stamp data, subtracting two successive time stamps to produce a time interval result representing the time interval between the successive events, and providing a time interval result output signal;
    comparator means, responsive to the time interval result output signal from the time stamp processor, for comparing the time interval result against minimum and maximum limits corresponding to the bounds of the selected time interval values and producing output signals indicative of the results of the comparison; and
    logic means responsive to the comparator output signals to produce a triggering signal for controlling a time interval measurement, if the time interval results are selected time interval values.

12. The processing circuit of claim 11 wherein the logic means comprises a multiplexer connected to the comparator means for selecting from eight signals, comprising MAXGT (greater than the maximum limit), MAXEQ (equal to the maximum limit), MAXLT (less than the maximum limit), MINGT (greater than the minimum limit), MINLT (less than the minimum limit), INRANGE (between or equal to the minimum and maximum limits), OUTRANGE (greater than the maximum limit or less than the minimum limit), and ISF TRIGGER (interval sampling frequency signal which specifies with two bits whether the time interval result output signal is equal to the maximum limit, equal to the minimum limit, between the minimum and maximum limits, or is greater than the maximum limit or less than the minimum limit), and wherein the triggering signal is generated responsive to the ISF TRIGGER signal.

13. The processing circuit of claim 11 wherein the time stamp processor comprises:
    time stamp subtracter means for subtracting the two successive time stamps to obtain a raw time interval result; and
    channel subtracter means for subtracting an offset from the time interval result to correct for channel skew, to obtain a corrected time interval result.

14. The processing circuit of claim 13 wherein the time stamp data comprises more significant binary data bits and less significant binary coded decimal data bits, and the time stamp processor further comprises:
    a transform processor for transforming the corrected time interval result to combine the more significant binary bits and the less significant binary coded decimal bits into a single binary bit stream.

* * * * *